United States Patent
Schorn et al.

(10) Patent No.: US 11,905,979 B2
(45) Date of Patent: Feb. 20, 2024

(54) PISTON, GEAR-CHANGE SELECTOR AND GEARSHIFT

(71) Applicant: FTE AUTOMOTIVE GmbH, Ebern (DE)

(72) Inventors: Andreas Schorn, Ebern (DE); Ralph Berger, Ebern (DE); Paul Marks, Ebern (DE); Alexander Landgraf, Ebern (DE)

(73) Assignee: FTE AUTOMOTIVE GmbH, Ebern (DE)

( * ) Notice: Subject to any disclaimer, the term of this patent is extended or adjusted under 35 U.S.C. 154(b) by 0 days.

(21) Appl. No.: 17/813,436

(22) Filed: Jul. 19, 2022

(65) Prior Publication Data

US 2023/0014514 A1     Jan. 19, 2023

(30) Foreign Application Priority Data

Jul. 19, 2021   (DE) .................. 10 2021 118 601.3

(51) Int. Cl.
*F15B 15/14*    (2006.01)
*F16H 61/30*    (2006.01)

(52) U.S. Cl.
CPC ............. *F15B 15/14* (2013.01); *F16H 61/30* (2013.01)

(58) Field of Classification Search
CPC ....... F15B 15/14; F16H 61/30; F04B 39/0016
See application file for complete search history.

(56) References Cited

U.S. PATENT DOCUMENTS

| 4,207,800 A | 6/1980 | Homuth | |
| 2010/0294795 A1* | 11/2010 | Boehm | .............. A61C 5/62 |
| | | | 222/137 |

FOREIGN PATENT DOCUMENTS

| DE | 1 205 390 B | 11/1965 |
| DE | 103 08 216 A1 | 9/2004 |
| DE | 10 2009 028 999 A1 | 3/2011 |
| DE | 10 2010 026 946 A1 | 1/2012 |
| DE | 10 2013 012 044 A1 | 1/2015 |

OTHER PUBLICATIONS

German Search Report dated Apr. 14, 2022 in German Application 10 2021 118 601.3, filed on July 19, 2021, 6 pages (with English Translation of categories of cited documents).
Extended European Search Report dated Nov. 23, 2022 in European Patent Application No. 22182663.9, 8 pages.

* cited by examiner

*Primary Examiner* — Terence Boes
(74) *Attorney, Agent, or Firm* — Oblon, McClelland, Maier & Neustadt, L.L.P.

(57) ABSTRACT

A piston, in particular for a gear-change selector, including a piston body with a piston skirt and with a piston end face which can be pressurised with a working fluid. The piston includes a first sealing portion and a second sealing portion. The piston body and the first sealing portion have mutually complementary geometries so that they form a first vent channel. The first vent channel is arranged in a hydraulic series circuit with the second sealing portion. The second sealing portion prevents venting up to a first pressure and allows this above the first pressure. The invention furthermore concerns a gear-change selector and a gearshift for a vehicle.

20 Claims, 4 Drawing Sheets

PISTON, GEAR-CHANGE SELECTOR AND GEARSHIFT

Figure 1:
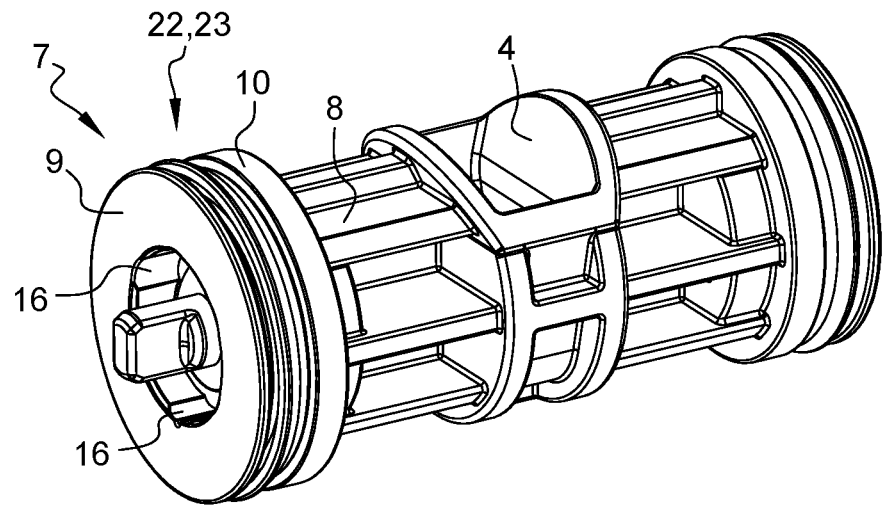

The invention concerns a hydraulic piston, a hydraulic gear-change selector for a transmission of a motor vehicle, and a gearshift with corresponding gear-change selector for a motor vehicle.

Hydraulic actuators in the form of single- or double-action hydraulic cylinders are used for various applications, here explained as an example for a gear-change selector for the transmission of a motor vehicle.

A gear-change selector is provided to actuate the shift forks on a transmission to engage the various gears. A hydraulically actuated gear-change selector comprises for this multiple hydraulic cylinders.

A hydraulic cylinder is a working cylinder operated by a fluid, and is also known as a hydraulic linear motor. A hydraulic cylinder converts the energy of a hydraulic fluid, supplied from a hydraulic pressure accumulator or hydraulic pump, into a linear movement. It usually comprises a piston which is adjustable in translation in a cylindrical tube portion.

Single-action cylinders have only one piston end which is loaded with the hydraulic fluid. Work can therefore only be performed in one direction. The return movement is ensured by own mass or an external force such as a return spring.

In double-action cylinders, there are two opposite piston and faces which are usually loaded alternately with hydraulic fluid. The cylinder therefore has two active movement directions.

At least before first commissioning of a hydraulic system but also after intervention on the system, such as repair, a hydraulic cylinder must be vented. Continuous venting may prevent air inclusions accumulating in the hydraulic cylinder over time.

At high pressures or on pressure fluctuations, air inclusions in the working medium or working fluid (hydraulic fluid) may cause the so-called diesel effect which leads to fluid ageing and loss of seal because of the greatly increased temperatures. A further negative effect is that air is diffused through the sealing material in the direction of the low-pressure side. Because the pressure falls greatly at the surface of the seal, causing the air inclusions to expand suddenly, the seal may wear prematurely.

A further disadvantage with existing venting solutions is that the working fluid continuously drains away through the vent. In particular in longer periods of non-use, this may lead to the hydraulic system drawing in air and in extreme cases running dry.

It is therefore an object of the invention to refine a piston of the type cited initially such that this can be vented without the piston drawing in air or running dry through the created vent during extended periods of non-use.

This object is achieved according to the invention by a piston, in particular for a gear-change selector, comprising a piston body with a piston skirt and with a piston end face which can be pressurised with a working fluid.

According to one aspect, the piston comprises a first sealing portion and a second sealing portion. The piston body and the first sealing portion here have mutually complementary geometries so that they form a first vent channel which is arranged in a hydraulic series circuit with the second sealing portion. The second sealing portion prevents venting up to a first pressure. The second sealing portion allows venting above the first pressure. In this way, air intake or dry running of the cylinder in extended periods of non-use is reliably prevented.

According to an advantageous aspect, the piston end face may have a depression in which a rubber-elastic sealing element is arranged, The first sealing portion may in particular be part of the sealing element. The piston body and the sealing element may have mutually complementary geometries so that they form the first vent channel with a first free cross-sectional area, and in a pressure-relieved state, between mutually opposing surfaces of the depression and the first sealing portion of the sealing element, form a second vent channel with a second free cross-sectional area. The first vent channel and the second vent channel may preferably be hydraulically connected in parallel. Furthermore, the depression and the sealing element may be configured such that, as the temperature of the sealing element rises, its modulus of elasticity falls, and a pressurisation of the sealing element by the working fluid leads to a temperature- and pressure-dependent elastic deformation of the sealing element. The elastic deformation in turn leads to a reduction in the free cross-sectional area of the second vent channel.

Since in many cases, the working fluid has a highly temperature-dependent viscosity, i.e. is more viscous at colder temperatures, a vent channel with constant free cross-section may, at low temperatures, lead to a volume flow which is too low to adequately vent the piston. At high temperatures however, the volume flow through a vent channel with constant cross-section is unnecessarily high, and therefore leads to high losses.

The influence of the pressure with which the piston end face or vent channel is loaded by the working fluid, or the pressure difference which forms over the vent channels, behaves similarly. At low pressure, the volume flow through the vent channel with fixed cross-sectional area would rather be small, but possibly inefficiently high at high pressure.

By suitable combination of the above mentioned aspects, a hydraulic piston may be provided which has vent channels with a pressure- and temperature-dependent (variable) free cross-sectional area.

The pressure and temperature-dependent free cross-sectional area automatically changes purely because of physical effects, such that the volume flow for venting is sufficiently large at a first temperature and/or first pressure, but nonetheless not excessively large at a second (higher) pressure and a second (higher) temperature.

Advantageously, the piston body and the sealing element may be configured such that the temperature- and pressure-dependent elastic deformation of the sealing element reduces the free cross-sectional area of the second vent channel more greatly than the free cross-sectional area of the first vent channel. Depending on design, it may even be preferred if the cross-sectional area of the first vent channel is substantially independent of pressure and temperature. For example, this may be achieved if the first vent channel extends from the piston end face (or another point of the piston loaded with working pressure) through the piston body, without the sealing element being able to act on the free cross-sectional area of the first vent channel, or partially cover the channel inlet.

According to a further advantageous aspect, the first vent channel and the second vent channel are arranged in a hydraulic series circuit with a second sealing portion. The second sealing portion is preferably configured such that it seals a vent opening in the piston body against the first and second vent channels up to a first pressure and opens this above the first pressure. In this way, the piston may be prevented from running dry, in particular in longer periods of non-use.

In various embodiments, the depression may have an outer region on the side of the piston end face, in which the rubber-elastic sealing element is arranged. Furthermore, the depression then comprises an inner region in which the vent opening is arranged. The second sealing portion, preferably in the form of a sealing lip, is arranged between the inner region and the outer region. Sealing lips have proved particularly suitable for the proposed purpose.

Preferably, the depression may have one or more vent grooves in its (side) wall, which, together with the first sealing portion, form the second vent channel. The vent grooves extend in the direction of the inner region from the piston end face to behind the outer region.

The respective vent groove is advantageously configured and dimensioned such that the second vent channel is not closed by the sealing element at the first pressure and/or at a first temperature, but rather has a maximal free cross-sectional area.

In this advantageous embodiment, it is furthermore provided that as the pressure and/or the temperature rise in comparison with the first pressure and/or temperature, the sealing element elastically deforms depending on the temperature and pressure, such that it increasingly closes the free cross-sectional area of the second vent channel, preferably until the second vent channel is substantially completely closed by the deformed sealing element above a second pressure and/or above a second temperature.

In this state, the free total cross-sectional area of the vent channels is minimal, so that with correspondingly high pressure or with temperature-induced, low-viscosity flow properties of the working medium, the volume flow through the vent channels is limited by means of the sealing element.

According to a further advantageous aspect, the at least one second vent groove has a flat free cross-section. Flat in this context means that the free cross-section has a height (in the radial direction) which is smaller than the width (in the circumferential direction). A flat free cross-section with rounded transitions may be partially or even completely closed by a sealing element which deforms under the applied pressure.

In one embodiment variant, the depression may have one or more vent notches in its wall which, in each case together with the first sealing portion, form the first vent channel (or several channels).

The vent notch extends in the direction of the inner region from the piston end face to behind the outer region. Furthermore, the vent notch is configured and dimensioned such that it is not closed by the sealing element even under a temperature- and pressure-dependent elastic deformation of the sealing element.

To this end, the vent notch may preferably have a deep free cross-section. Deep in this context means that the free cross-section in the radial direction has a height which is greater than the width. A deep free cross-section may only be poorly covered or not covered at all by the deformed sealing element.

According to a further advantageous aspect, the second vent channel may have a smaller maximal distance from the sealing element than the first vent channel. Thus, when deformed, the sealing element firstly/exclusively covers the second vent channel.

In a preferred embodiment variant, the depression is an end-face ring groove extending in the axial direction. This shape has proved particularly advantageous and offers a particularly good retention for the sealing element.

The piston may have a piston seal. The piston seal may comprise a radial circumferential groove in the piston skirt of the piston. Preferably, a self-sealing piston groove ring with a sealing lip may be arranged in the circumferential groove.

Preferably, the piston may be a double-action piston. The piston body then has a piston end face of the above-described type on both sides.

As a whole, the invention or its advantageous embodiments take account of the concept that a ring groove is provided on the end face of the piston, in the wall of which a plurality of vent grooves and at least one vent notch are machined.

A sealing ring is positioned in the ring groove which, together with the geometry of the vent grooves and the vent notch, defines the free cross-sectional areas of the vent channels.

An additional sealing lip on the sealing ring ensures that the vent channels or vent openings are completely sealed below a defined working pressure so that the hydraulics cannot run dry.

Depending on the working pressure, the sealing ring, which is elastically deformed by the working pressure, partially or completely closes the vent grooves while the vent notch remains open irrespective of working pressure. In a pressure-less state, the free cross-sectional area is maximal.

At high operating temperatures, the stiffness of the sealing ring diminishes so that a comparable working pressure at higher temperature also leads to a smaller free cross-sectional area. At low temperatures, in contrast, the sealing ring is very stiff so that the free cross-sectional area of the vent channels is approximately maximal irrespective of working pressure. The temperature-dependent viscosity of the working fluid is thus compensated.

A gear-change selector for a gearshift is also provided. The gear-change selector has at least one, preferably several, and in particular two to six of the pistons described initially. The gear-change selector can be used/installed particularly flexibly and easily as a gear-change selector module which can be mounted on a transmission.

Also, a gearshift is provided comprising a gear-change selector of the above-described type.

Figure 2:
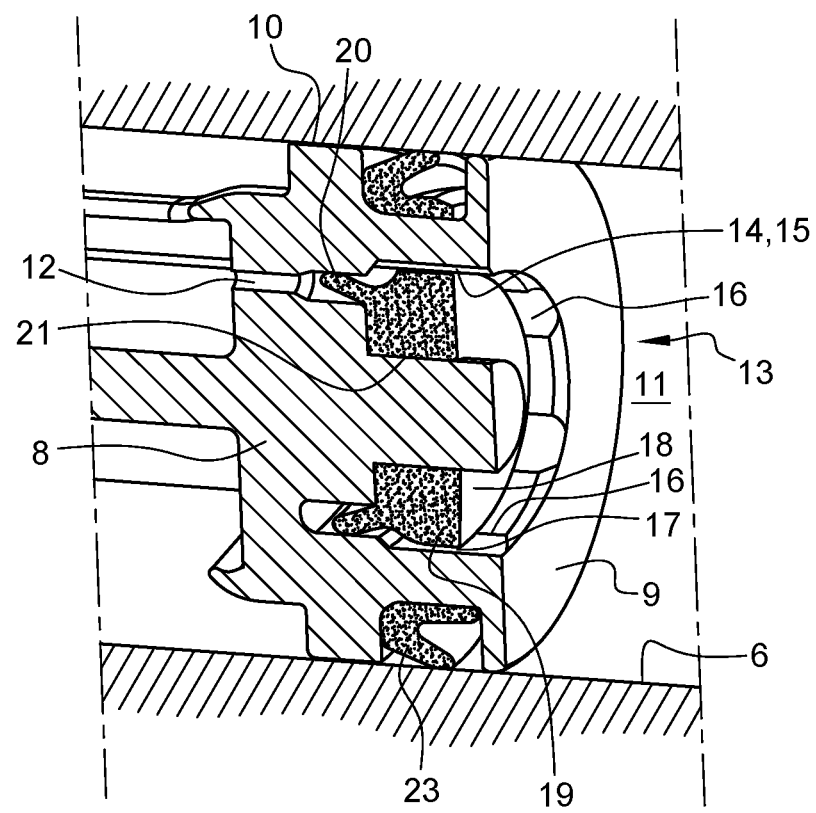
Figure 3:
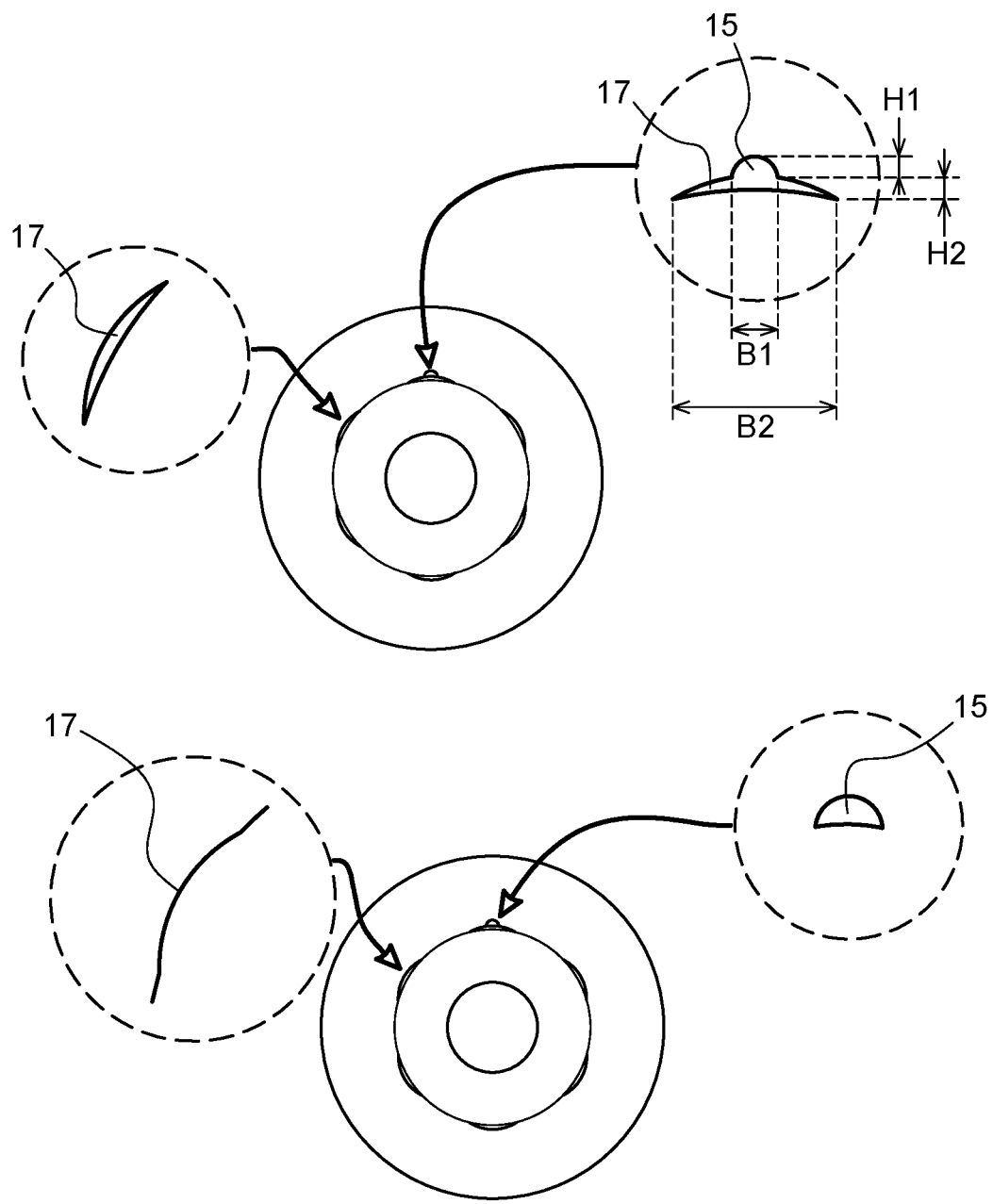
Figure 4:
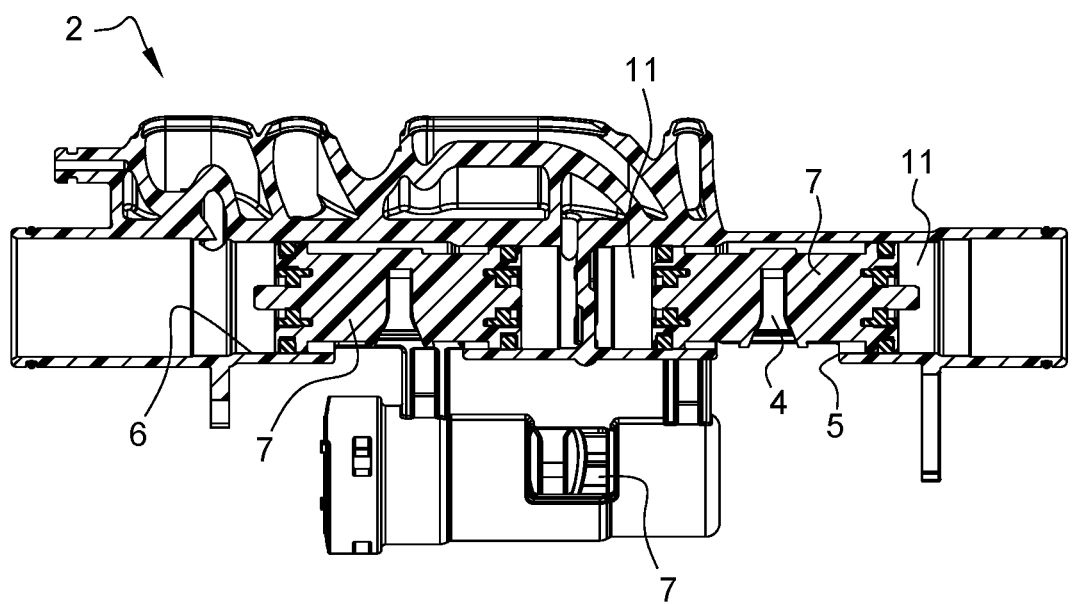
Figure 5:
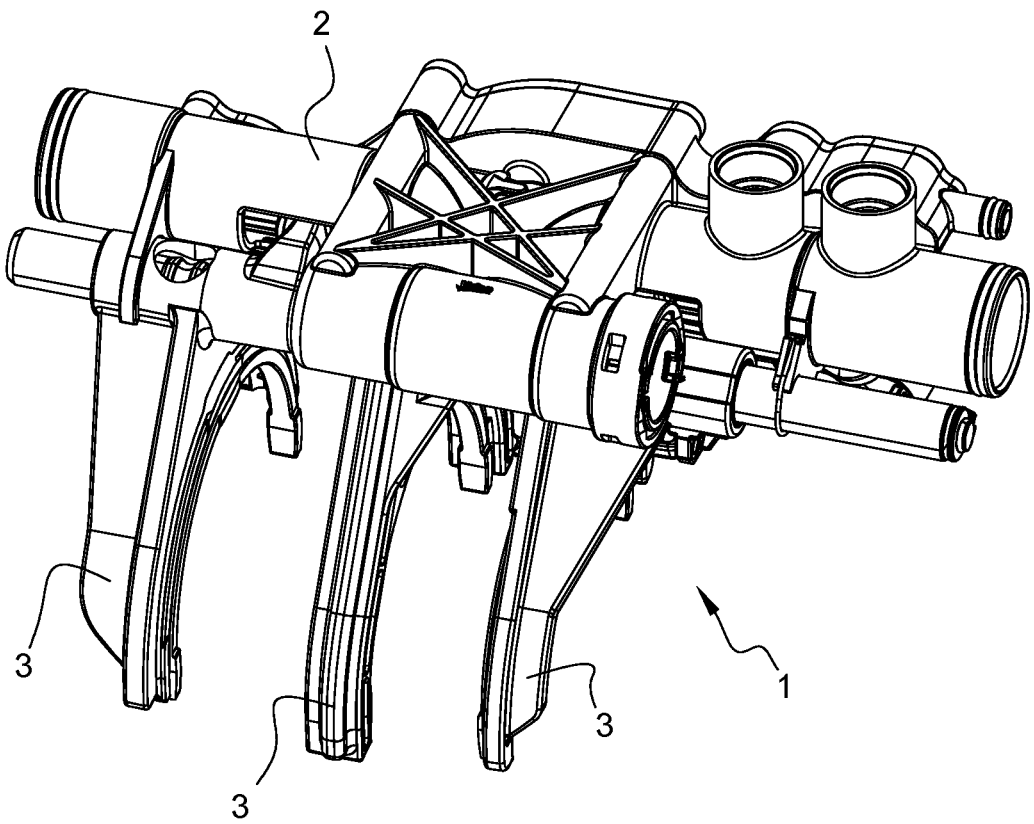

Further features and advantages of the invention arise from the following description and the appended drawings to which reference is made. The drawings show:

FIG. 1 a perspective view of a piston according to the invention;

FIG. 2 a perspective, sectional view of a piston according to the invention in an installation situation;

FIG. 3 a schematic illustration of exemplary vent channels and their free cross-sectional areas at low and high operating pressure;

FIG. 4 a sectional view through a gear-change selector module according to the invention;

FIG. 5 a perspective view of a gearshift; and

Figure 6:
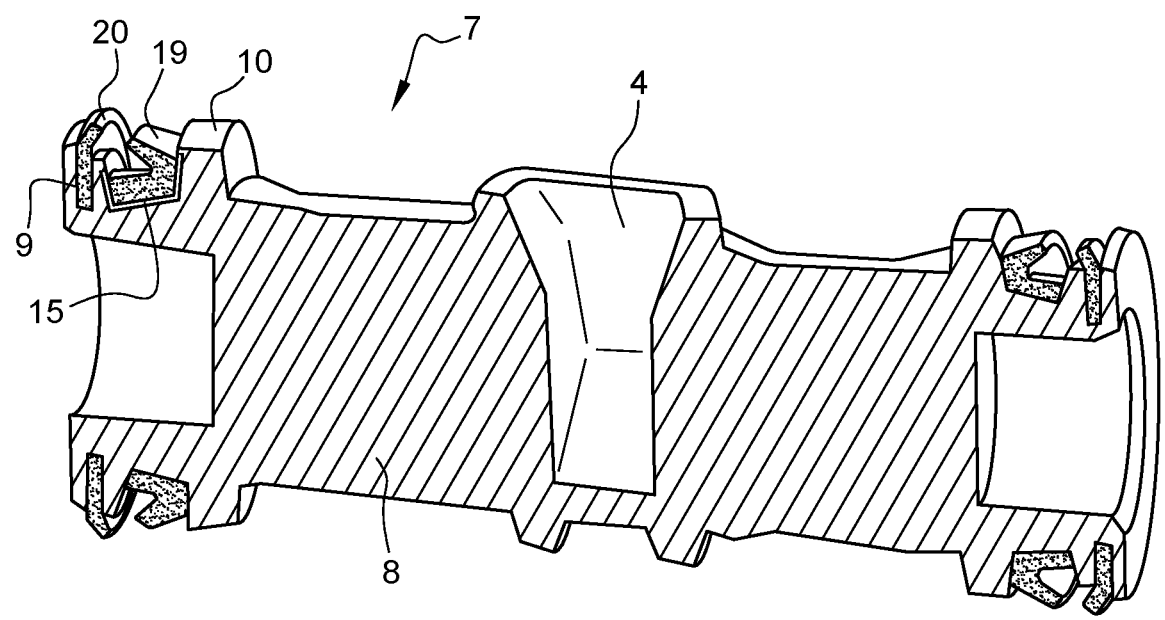

FIG. 6 a further exemplary embodiment of a piston according to the invention.

FIG. 1 shows a piston 7 for a gear-change selector 2. The piston 7 comprises a piston body 8 with a piston skirt 10 and a piston end face 9 which can be pressurised with a working fluid. The piston may be made of PPA (polyphthalamide).

The piston 7 comprises a first sealing portion 19 and a second sealing portion 20. The piston body 8 and the first sealing portion 19 have mutually complementary geometries so that they form a first vent channel 15. The first vent channel 15 is arranged in a hydraulic series circuit with the second sealing portion 20. The second sealing portion 20 prevents venting up to a first pressure P1 and allows this above the first pressure P1.

The piston end face 9 has a depression 13. A rubber-elastic element 18 (not shown here) is arranged in the depression 13 (see FIG. 2).

The piston 7 is a double-action piston. The piston body 8 has piston end faces 9 of the above-described type on both sides.

FIG. 2 shows in perspective a section through the piston 7. The piston body 8 and the sealing element 18 have mutually complementary geometries. They form a first vent channel 15 with a first free cross-sectional area. Furthermore, at least in a pressure-relieved state, between mutually facing surfaces of the depression 13 and a first sealing portion 19 of the sealing element 18, they form a second vent channel 17 with a second free cross-sectional area.

The first vent channel 15 and the second vent channel 17 are hydraulically connected in parallel. Both open into the inner region of the depression 13.

Furthermore, the depression 13 and the sealing element 18 may be configured such that, as the temperature of the sealing element 18 rises, its modulus of elasticity falls, and a pressurisation of the sealing element 18 by the working fluid 11 leads to a temperature- and pressure-dependent elastic deformation of the sealing element 18. The elastic deformation in turn causes a reduction in the free cross-sectional area of the second vent channel 17.

The first vent channel 15 and the second vent channel 17 are arranged in a hydraulic series circuit with a second sealing portion 20. The second sealing portion 20 seals a vent opening 12 in the piston body 8 against the first and second vent channels 15, 17 up to a first pressure P1. The second sealing portion 20 opens the vent opening above the first pressure P1.

The depression 13 has an outer region on the side of the piston end face 9, in which the rubber-elastic sealing element 18 is arranged. The depression 13 furthermore comprises an inner region which contains the vent opening 12. The second sealing portion 20, in the form of a sealing lip, is arranged between the inner region and the outer region.

The depression 13 has a vent groove 16 in its wall. The vent groove 16, together with the first sealing portion 19, forms the second vent channel 17. The vent groove 16 extends in the direction of the inner region from the piston end face 9 to behind the outer region, and is configured and dimensioned such that the second vent channel 17 is not closed by the sealing element 18 at the first pressure P1 and/or a first temperature T1. The vent groove 16 is furthermore configured and dimensioned such that the sealing element 18, which has elastically deformed depending on pressure and temperature, increasingly closes the free cross-sectional area of the second vent channel 17 as the pressure Px and/or temperature Tx rises. The second vent channel 17 is substantially completely closed above a second pressure P2 and/or a second temperature T2. The second pressure P2 is higher than the first pressure P1. The second temperature T2 is higher than the first temperature T1.

The depression 13 has a vent notch 14 in its wall, which, together with the first sealing portion 19 of the sealing element 18, forms the first vent channel 15. The vent notch 14 extends in the direction of the inner region from the piston end face 9 to behind the outer region. The vent notch 14 is configured and dimensioned such that it is not closed by the sealing element 18 even under a temperature- and pressure-dependent elastic deformation of the sealing element 18.

The depression 13 is an end-face ring groove extending in the axial direction.

The piston 7 has a piston seal. The piston seal comprises a radial circumferential groove 22 in the piston skirt 10. A self-sealing piston groove ring 23 with a self-sealing sealing lip is arranged in the circumferential groove 22. The sealing lip lies on the inner wall 6 of the cylinder in which the piston 7 is displaceably received, and seals there.

FIG. 3 shows schematically the free cross-sectional areas of the first and second vent channels 15, 17.

The piston body 8 and the sealing element 18 are configured such that the temperature- and pressure-dependent elastic deformation of the sealing element 18 reduces the free cross-sectional area of the second vent channel 17 more greatly than the free cross-sectional area of the first vent channel 15.

The vent channels 15, 17 are shown at the top at the first pressure P1. Both the first and the second vent channels 15, 17 are open and have the maximal free cross-sectional area.

The lower region of FIG. 3 shows the vent channels 15, 17 at the higher pressure P2. The flat vent grooves are completely filled by the sealing element which has been elastically deformed by the acting pressure. The second vent channels 17 therefore have no free cross-sectional area, but are completely closed.

The vent groove 16 has a flat free cross-section, in particular a height H2 which is smaller in the radial direction than the width B2 in the circumferential direction.

The vent notch 14 has a deep free cross-section, in particular a height H1 which is greater in the radial direction than the width B1 in the circumferential direction.

The second vent channel 17 has a smaller maximal distance from the sealing element 18 than the first vent channel 15.

Because of the deep design of the vent notch 14 and the arrangement thereof further away from the sealing element 18, the deformed sealing element 18 does not fill the vent notch 14 even at the higher pressure P2. The cross-sectional area of the first vent channel 15 is thus substantially unchanged.

For example, for hydraulic oil as used in gear-change selectors, a minimum flow rate may be provided of 0.08 l/min to 0.15 l/min at a first temperature T1 in the range from −20° C. to −30° C. and a first working pressure P1 of the order of 70 psi. In contrast, a maximum flow rate may be provided of 0.4 l/min to 0.7 l/min at a second temperature T2 in the range from 100° C. to 130° C. and a second working pressure P2 of the order of 300 psi. Up to a working pressure of 3 psi (or 15 psi), the system should be completely sealed so that it does not drain during longer stoppage periods and there is no risk of damage on recommissioning.

FIG. 4 shows a gear-change selector 2 for a gearshift in cross-section. The gear-change selector 2 has several pistons 7. The gear-change selector 2 is configured as a gear-change selector module which can be mounted on a transmission.

FIG. 5 shows at least parts of a gearshift. The gearshift comprises a gear-change selector 2 of the type described above. The gearshift may be part of a motor vehicle. The transmission itself is not shown, for the sake of greater clarity.

FIG. 6 shows a further embodiment of a piston 7. The piston 7 comprises a first sealing portion 19 and a second sealing portion 20. The piston body 8 and the first sealing portion 19 have mutually complementary geometries so that they form a first vent channel 15. The first vent channel 15 is arranged in a hydraulic series circuit with the second sealing portion 20. The second sealing portion 20 prevents venting up to a first pressure P1 and allows this above the first pressure P1.

The piston 7 has a piston seal. The piston seal comprises a radial circumferential groove in the piston skirt 10. A self-sealing piston groove ring with a sealing lip is arranged in the circumferential groove 22.

The piston 7 is a double-action piston. The piston body 8 has piston end faces 9 of the above-described type on both sides.

The invention claimed is:

1. A piston for a gear-change selector, comprising:
   a piston body with a piston skirt and with a piston end face which can be pressurised with a working fluid,
   wherein the piston comprises a first sealing portion and a second sealing portion, wherein the piston body and the first sealing portion have mutually complementary geometries so that they form a first vent channel,
   wherein the first vent channel is arranged in a hydraulic series circuit with the second sealing portion, and
   wherein the second sealing portion is configured to prevent venting up to a first pressure and allows venting above the first pressure.

2. The piston according to claim 1, wherein the piston end face has a depression in which a rubber-elastic sealing element is arranged, wherein the first sealing portion is part of the sealing element, wherein the piston body and the sealing element have mutually complementary geometries so that they form the first vent channel with a first free cross-sectional area, and in a pressure-relieved state, between mutually opposing surfaces of the depression and the first sealing portion, form a second vent channel with a second free cross-sectional area, wherein the first vent channel and the second vent channel are hydraulically connected in parallel, and furthermore wherein the depression and the sealing element are configured such that, as the temperature of the sealing element rises, its modulus of elasticity falls, and a pressurisation of the sealing element by the working fluid leads to a temperature- and pressure-dependent elastic deformation of the sealing element, and by means of the elastic deformation, to a reduction in the free cross-sectional area of the second vent channel.

3. The piston according to claim 2, wherein the piston body and the sealing element are configured such that the temperature- and pressure-dependent elastic deformation of the sealing element reduces the free cross-sectional area of the second vent channel more greatly than the free cross-sectional area of the first vent channel.

4. The piston according to claim 2, wherein the first vent channel and the second vent channel are arranged in a hydraulic series circuit with the second sealing portion, wherein the second sealing portion seals a vent opening in the piston body against the first and second vent channels up to a first pressure and opens this above the first pressure.

5. The piston according to claim 4, wherein the depression has an outer region on the side of the piston end face, in which the rubber-elastic sealing element is arranged, and an inner region comprising the vent opening, wherein the second sealing portion in the form of a sealing lip is arranged between the inner region and the outer region.

6. The piston according to claim 4, wherein the depression has a vent groove in its wall, which, together with the first sealing portion, forms the second vent channel, wherein the vent groove extends in the direction of the inner region from the piston end face to behind the outer region, and is configured and dimensioned such that the second vent channel is not closed by the sealing element at a first pressure and/or at a first temperature, and the temperature- and pressure-dependently elastically deformed sealing element increasingly closes the free cross-sectional area of the second vent channel as the pressure rises and/or the temperature rises, until the second vent channel is substantially completely closed above a second pressure and/or above a second temperature.

7. The piston according to claim 6, wherein the vent groove has a height (h) which is smaller in the radial direction than a width (b) in the circumferential direction.

8. The piston according to claim 5, wherein the depression has a vent notch in its wall, which, together with the first sealing portion, forms the first vent channel, wherein the vent notch extends in the direction of the inner region from the piston end face to behind the outer region, and is configured and dimensioned such that the vent notch is not closed by the sealing element even under a temperature- and pressure-dependent elastic deformation of the sealing element.

9. The piston according to claim 8, wherein the vent notch has a height (h) which is greater in the radial direction than a width (b) in the circumferential direction.

10. The piston according to claim 2, wherein the second vent channel has a smaller maximal distance from the sealing element than the first vent channel.

11. The piston according to claim 2, wherein the depression is an end-face ring groove extending in the axial direction.

12. The piston according to claim 1, wherein the piston has a piston seal, wherein the piston seal comprises a radial circumferential groove in the piston skirt, and wherein a self-sealing piston groove ring with a sealing lip is arranged in the circumferential groove.

13. The piston according to claim 1, wherein the piston is a double-action piston.

14. A gear-change Gear change selector for a gearshift, wherein the gear-change selector comprises several pistons according to claim 1, wherein the gear-change selector is a gear-change selector module which can be mounted on a transmission.

15. A gearshift comprising a gear-change selector according to claim 14.

16. The piston according to claim 3, wherein the first vent channel and the second vent channel are arranged in a hydraulic series circuit with the second sealing portion, wherein the second sealing portion seals a vent opening in the piston body against the first and second vent channels up to a first pressure and opens this above the first pressure.

17. The piston according to claim 5, wherein the depression has a vent groove in its wall, which, together with the first sealing portion, forms the second vent channel, wherein the vent groove extends in the direction of the inner region from the piston end face to behind the outer region, and is configured and dimensioned such that the second vent channel is not closed by the sealing element at a first pressure and/or at a first temperature, and the temperature- and pressure-dependently elastically deformed sealing element increasingly closes the free cross-sectional area of the second vent channel as the pressure rises and/or the temperature rises, until the second vent channel is substantially completely closed above a second pressure and/or above a second temperature.

18. The piston according to claim 5, wherein the depression has a vent notch in its wall, which, together with the first sealing portion, forms the first vent channel, wherein the vent notch extends in the direction of the inner region from the piston end face to behind the outer region, and is configured and dimensioned such that the vent notch is not closed by the sealing element even under a temperature- and pressure-dependent elastic deformation of the sealing element.

19. The piston according to claim 3, wherein the second vent channel has a smaller maximal distance from the sealing element than the first vent channel.

20. The piston according to claim 3, wherein the depression is an end-face ring groove extending in the axial direction.

* * * * *